United States Patent [19]

Shiozawa et al.

[11] Patent Number: 5,082,041
[45] Date of Patent: Jan. 21, 1992

[54] TIRE WHEEL

[75] Inventors: Shinji Shiozawa, Fussa; Masato Hodate, Higashiyamato, both of Japan

[73] Assignee: Bridgestone Corporation, Tokyo, Japan

[21] Appl. No.: 660,820

[22] Filed: Feb. 26, 1991

[51] Int. Cl.$^5$ .............................................. B60B 21/02
[52] U.S. Cl. ............................. 152/381.3; 152/381.4; 152/379.3
[58] Field of Search ...................... 301/95, 96, 97, 98, 301/99; 152/381.3, 379.3, 379.4, 379.5, 381.4, 382, 383, 384, DIG. 17

[56] References Cited

U.S. PATENT DOCUMENTS

| | | | |
|---|---|---|---|
| 3,405,755 | 10/1968 | Verdier | 152/381.3 |
| 3,910,336 | 10/1975 | Boileau | 152/381.3 |
| 4,246,950 | 1/1981 | Welter | 152/381.4 |

FOREIGN PATENT DOCUMENTS

| | | | |
|---|---|---|---|
| 0176647 | 4/1986 | European Pat. Off. | 152/381.4 |
| 0377338 | 7/1990 | European Pat. Off. | |

Primary Examiner—Russell O. Stormer
Attorney, Agent, or Firm—Sughrue, Mion, Zinn, Macpeak & Seas

[57] ABSTRACT

A tire wheel includes a pair of flanges provided at both axial ends, a pair of bead seats axially inwardly extending from the flanges, a well provided between the bead seats and concaved radially inwardly of the bead seats, and a hump provided between the well and at least one of the bead seats. The hump circumferentially extends and has a seat side inclined surface on the side of the relevant bead seat and a well side inclined surface on the side of the well on both sides of a crest of the hump. The seat side inclined surface of the hump includes an inclined surface continuous to the crest of the hump and an inclined surface rising from the relevant bead seat. A concaved corner having an obtuse angle is provided between the relevant bead seat and the inclined surface rising from the relevant bead seat.

7 Claims, 7 Drawing Sheets

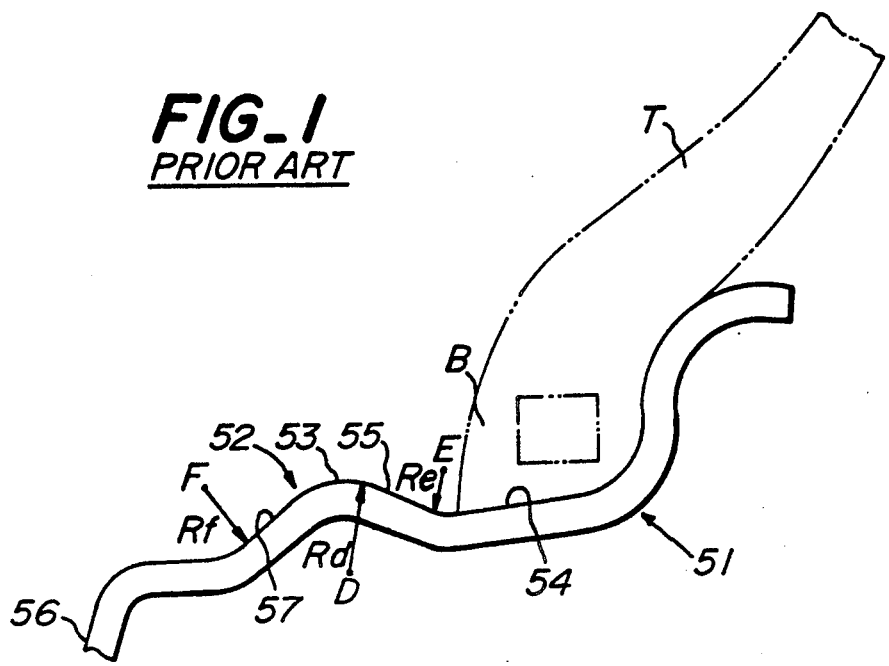
FIG_1
PRIOR ART
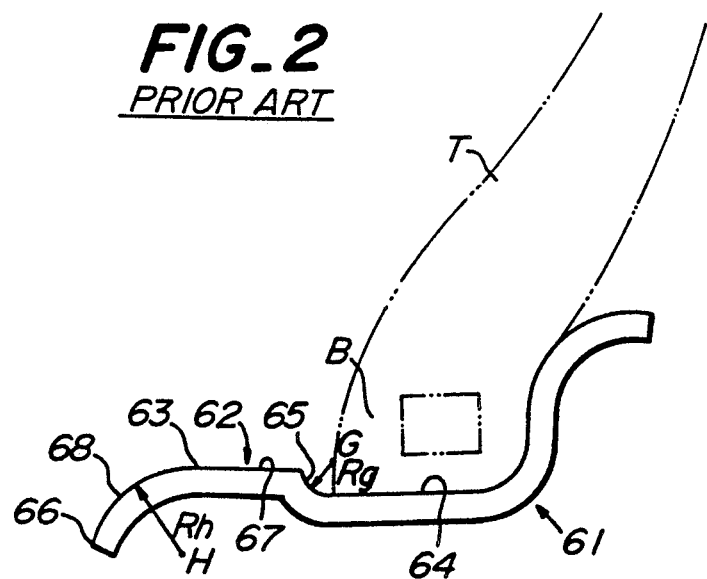
FIG_2
PRIOR ART

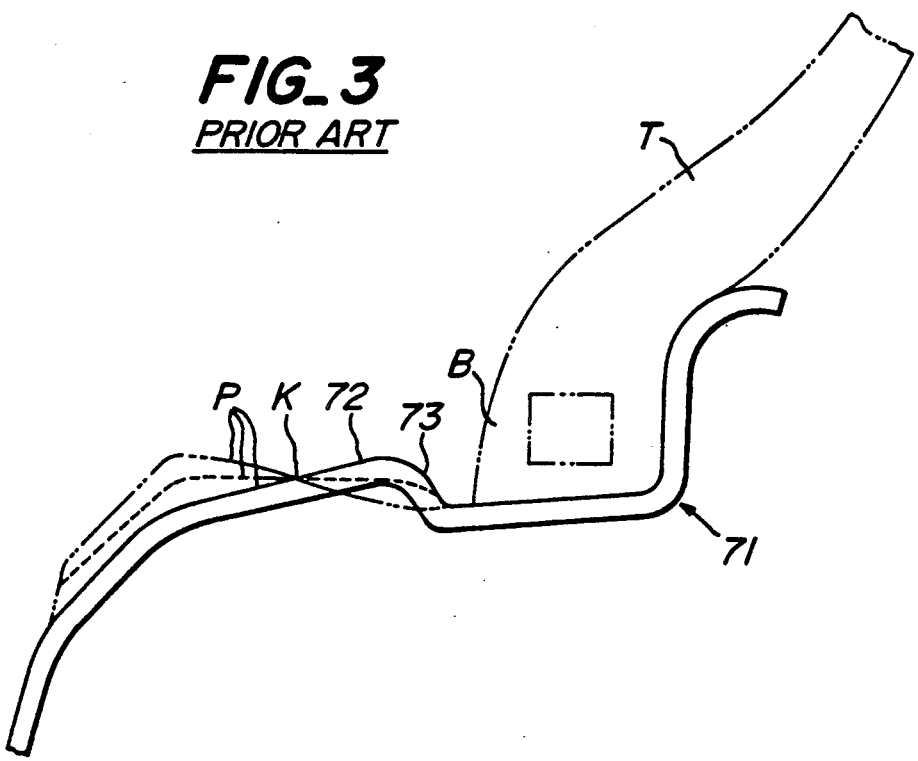
FIG_3
PRIOR ART
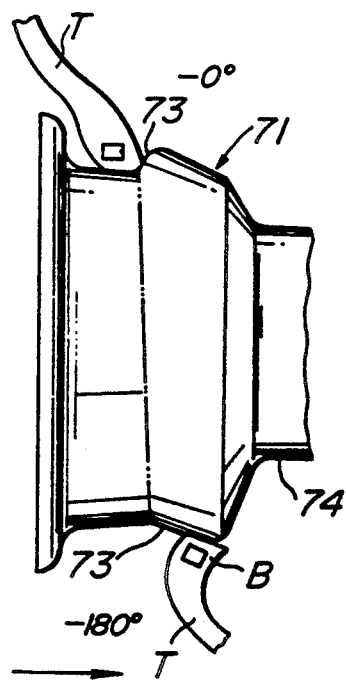
FIG_4
PRIOR ART

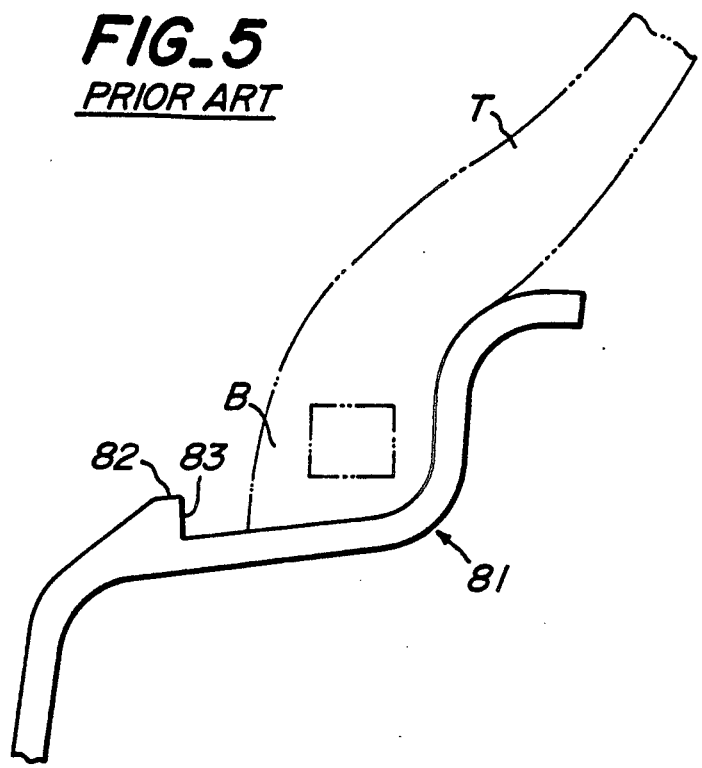
FIG_5
PRIOR ART
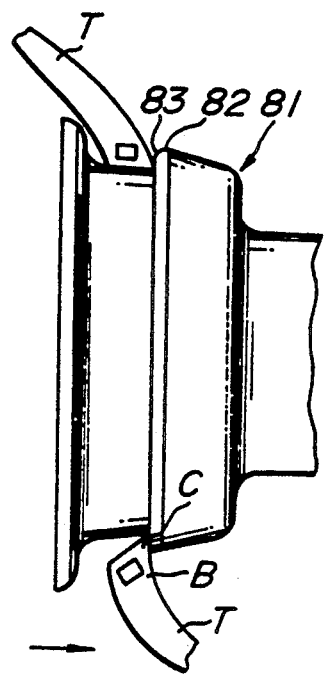
FIG_6
PRIOR ART

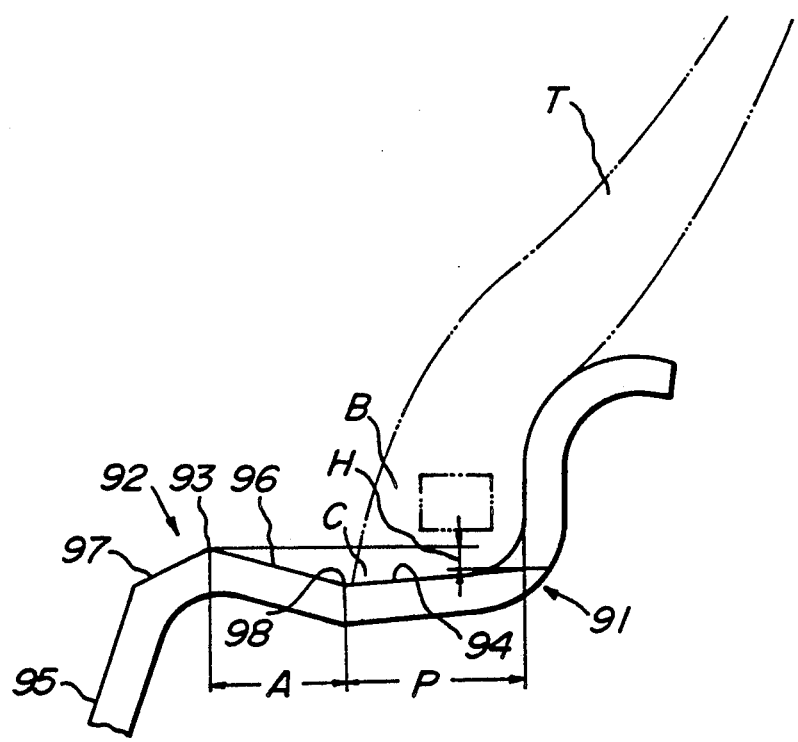
FIG_7

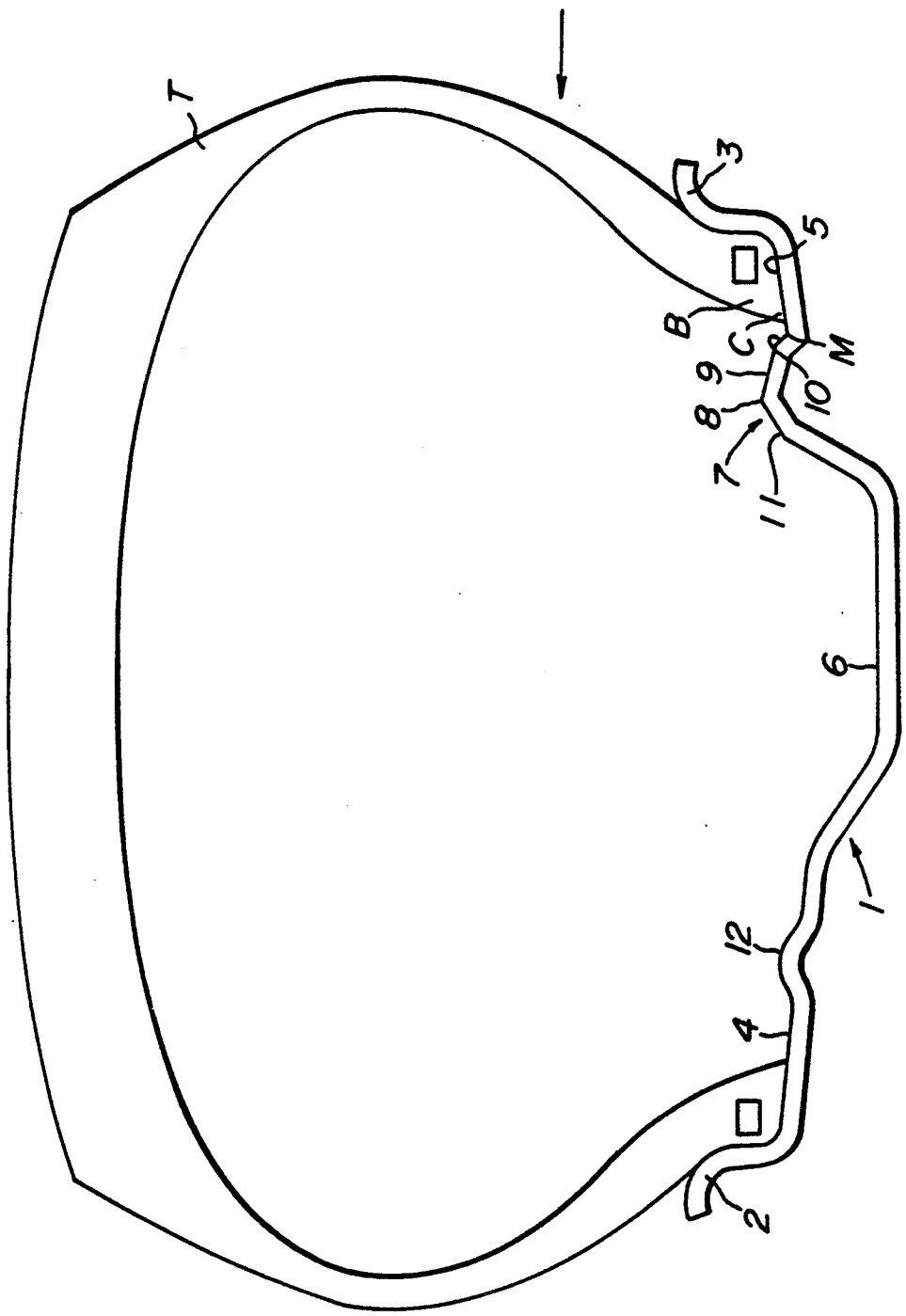
FIG._8

FIG_9
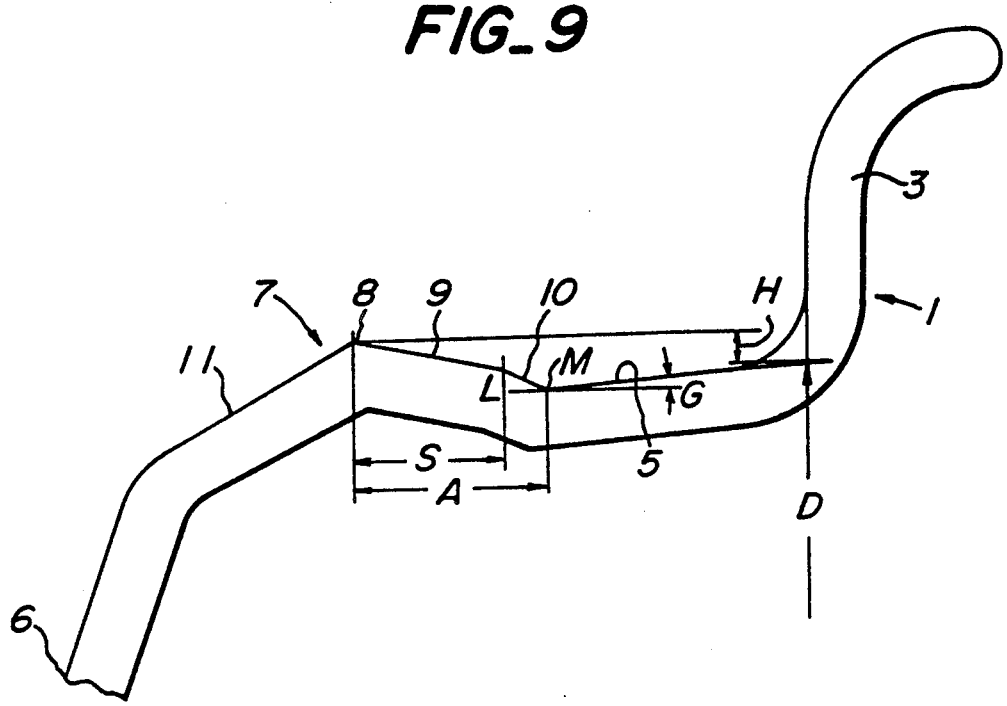
FIG_10
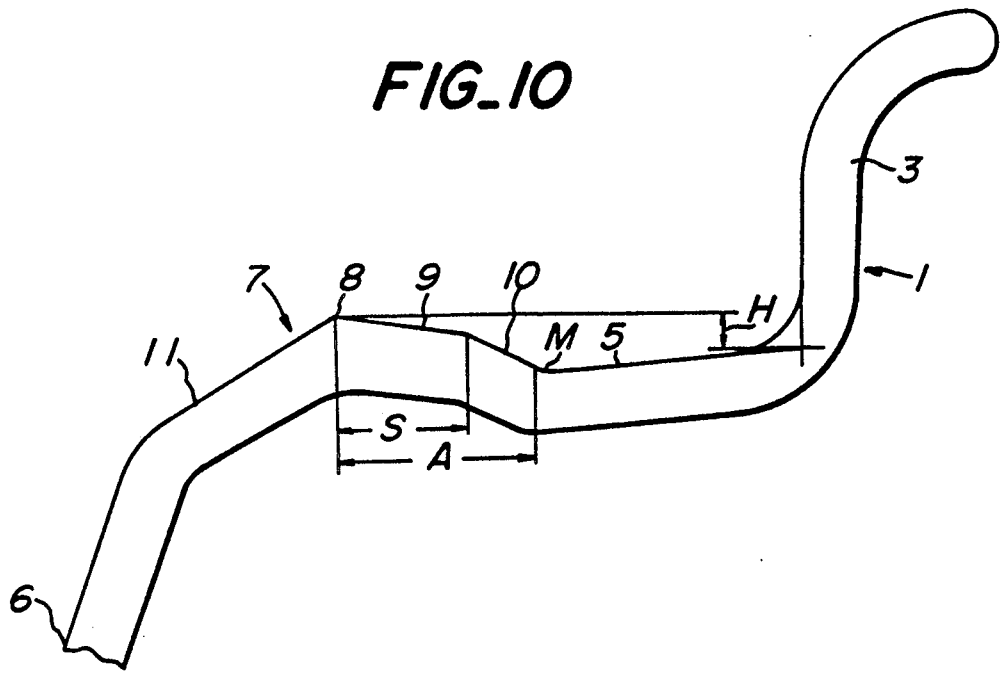

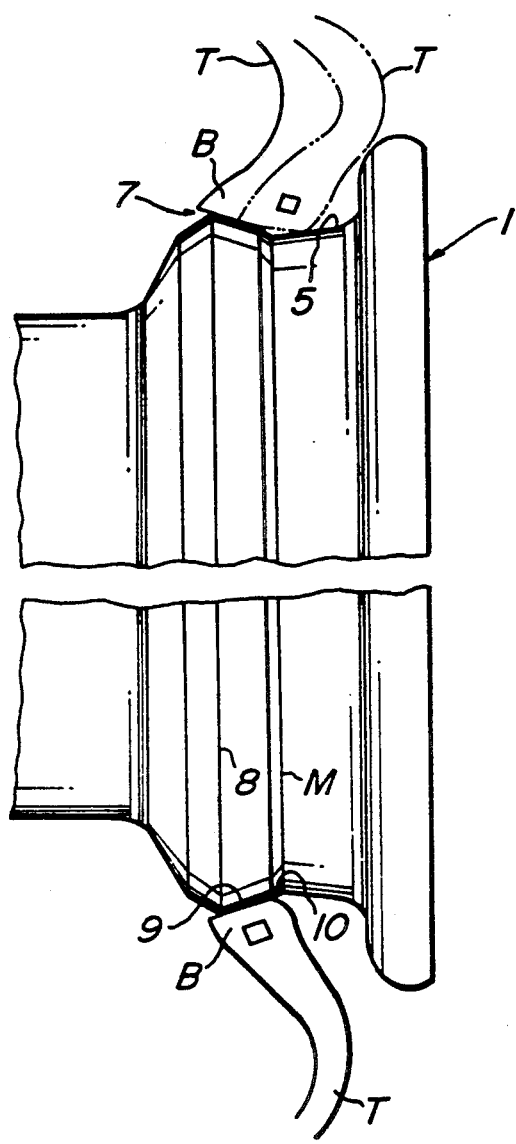
FIG_11

TIRE WHEEL

BACKGROUND OF THE INVENTION

This invention relates to a tire wheel capable of preventing bead portions from falling from bead seats onto a well when tire inner pressure lowers. It is also capable of easily mounting and dismounting a tire onto and from the tire wheel with the aid of a hump provided on the tire wheel.

Tire wheels having humps described above have been known, one of which is shown in FIG. 1 by way of example. The hump 52 of this tire wheel 51 shown in FIG. 1 includes on both sides of a crest 53, a seat side inclined surface 55 on the side of a bead seat 54 and a well side inclined surface 57 on the side of a well 56. The seat side inclined surface 55 is composed of a circular arc surface radially outwardly convexed and having a radius Rd with a center D and a circular arc surface radially inwardly concaved and having a radius Re with a center E. On the other hand, the well side inclined surface 57 is also composed of a circular arc surface having the radius Rd and a circular arc surface radially inwardly concaved and having a radius Rf with a center F.

In this case, as the seat side inclined surface 55 of the hump 52 is composed of the two smoothly transitional circular arc surfaces, a bead portion B of a pneumatic tire T easily rides over the hump 52 to fall onto the well 56 when the inner pressure of the pneumatic tire T lowers owing to puncture or the like, while the pneumatic tire T is subjected to a large lateral or transverse force in turning of a vehicle equipped with the tire. This is a problem of such a wheel to be solved by this invention.

Moreover, a tire wheel 61 has been proposed as shown in FIG. 2. This tire wheel 61 includes a circular arc surface 65 radially inwardly concaved from a top 63 of a hump 62 onto the side of a bead seat 64 and having a radius Rg with a center G, a relatively long flat surface 67 (usually of the order of 4 to 5 mm) extending toward a well 66, and a circular arc surface 68 continuous to the well 66 and radially outwardly convexed having a radius Rh with a center H. However, this tire wheel encounters the same problem as described above.

In order to solve such a problem, for example, tire wheels as shown in FIGS. 3 and 5 have been proposed. With the tire wheel 71 shown in FIG. 3, the sectional shape of a hump 72 is changed depending upon its circumferential positions. The sectional shapes of the hump 72 are respectively shown in solid lines at the circumferentially 0° position, in a dash line at the circumferentially 90° and 270° positions, and in a two-dots-and-dash line at the circumferentially 180° position. In other words, this shape of the tire wheel is formed by progressively changing inclined angles of a surface P around an axially constant position K correspondingly to circumferential positions of the surface P. A seat side inclined surface 73 is inclined at a large angle to a tire rotating axis at the circumferentially 0° position, but inclined at a small angle to the rotating axis at the circumferentially 180° position.

On the other hand, a tire wheel 81 shown in FIG. 5 includes a seat side inclined surface 83 of a hump 82 arranged at substantially perpendicular to a tire rotating axis or extending substantially radially outwardly.

With the tire wheel 71 shown in FIG. 3, however, the inclined angles of the seat side inclined surface 73 change depending upon circumferential positions as shown in FIG. 4. Therefore, when inner pressure in a pneumatic tire T mounted on the tire wheel 71 lowers, while the pneumatic tire is subjected to a lateral force in a direction shown by an arrow in FIG. 4, the bead portion of the tire T behaves in the following manner. In the proximity of the circumferentially 0° position where the inclined angle of the seat side inclined surface 73 is large, the bead portion engages the seat side inclined surface 73 to make movement of the bead portion difficult toward the well 74. However, in the proximity of the circumferentially 180° position where the inclined angle of the seat side inclined surface 73 is small, the bead portion can move easily toward the well 74.

Once a circumferential portion of the bead portion B (bead portion at the 180° position) has deformed and ridden on the seat side inclined surface 73 in this manner, the deformed and ridden portion progressively increases as road contacting portion of the rolling tire moves along its circumference and the tire is subjected to the lateral force until the bead portion falls onto the well 74. Although this tire wheel 71 can improve the prevention of the bead portion B from falling onto the well 74 to a some extent in comparison with the tire wheel 51 shown in FIG. 1, it is not sufficient to use the tire wheel 71 for high performance tires which have been recently developed. Moreover, there is a problem of the tire wheel 71 being peculiar in configuration so that forming thereof is difficult and expensive.

With the another tire wheel 81 shown in FIG. 5, on the other hand, the seat side inclined surface 83 of the hump 82 extends substantially perpendicular to the tire rotating axis as shown in FIG. 6. Therefore, when the inner pressure in the pneumatic tire T lowers and the tire is subjected to a lateral force in a direction shown by an arrow in FIG. 6, a bead toe C of a bead portion corresponding to a road contacting portion engages the seat side inclined surface 83 so that the bead toe C is subjected to a great shearing force. As a result, the bead toe C is partially damaged (bead toe chipping) so that there is a risk of carcass cords and the like of the bead portion being exposed.

Moreover, this tire wheel 81 encounters a difficulty in that bead toe chipping would occur when the tire T is dismounted from the tire wheel 81 because of the fairly large force which is required in dismounting of the tire from the wheel 81.

In order to solve these problems, the inventors of this application proposed a tire wheel 91 shown in FIG. 7 as disclosed by a copending U.S. patent application Ser. No. 07-456,911 which is incorporated herein by reference. In this tire wheel 91, the height H of a crest 93 of a hump 92 (one half of difference between the diameter of the crest 93 and the actual diameter of a rim) is set 0.5 mm to 2.5 mm. On both sides of the crest 93 the hump 92 is formed with an inclined surface 96 on the side of a bead seat 94 and an inclined surface 97 on the side of a well 95. The inclined surface 96 on the side of the bead seat 94 is inclined at an angle of about 5° to 30° to a straight line in parallel with a tire rotating axis, while a concaved corner 98 having an obtuse angle is formed at a boundary between the inclined surface 96 and the bead seat 94.

With this tire wheel 91, when inner pressure in a pneumatic tire T lowers and the tire T is subjected to a lateral force, a tire toe C rides over the corner 98 having the obtuse angle and at the same time the entire circumferential surface of a bead portion B of the tire T completely rides on the inclined surface 96. Therefore, as the bead portion B approaches the crest 93 of the hump 92, the bead portion B exhibits a so-called "hoop effect" so that the bead portion B is fixed to the inclined surface 96. Consequently, the bead portion B is prevented from falling onto the well 95 in this manner. This tire wheel 91 already proposed by the inventors is very superior to those of the prior art in the prevention of bead portion from falling onto the well.

However, this tire wheel 91 has room for more improvement. In more detail, in case that the inclined angle of the inclined surface 96 on the side of the bead seat 94 (with respect to the tire rotating axis) is less than about 10°, a distance A between the corner 98 having the obtuse angle and the crest 93 of the hump 92 at the top of the inclined surface 96 becomes too long. Such a long distance A makes difficult the tire mounting and dismounting operation.

In order solve this problem, the inventors of this application further investigated the distance A between the crest 93 of the hump 92 and the corner 98 in many experiments. As a result, they have found that the distance A of 15 mm to 16 mm is an upper limit to avoid the difficulty in tire mounting and dismounting operation, and a distance A longer than this value exhibits too large a hoop effect at a bead portion so that more consideration is required in actual application.

On the other hand, the preferable lower limit of the height H of the crest 93 of the hump 92 is of the order of 1 mm in consideration of prevention of the bead portion from falling onto the well. In connection with the height H and the tire mounting and dismounting operation, the inclined angle of the inclined surface 96 becomes somewhat larger than 10° in order to maintain the distance A about 15 mm and the height H approximately 1 mm. Even if it is attempted to set an inclined angle of 10° and a height H of 1.5 mm as a desirable mean value, the distance A becomes about 19 mm which makes difficult the tire mounting and dismounting operation.

As can be seen from the above explanation, although the tire wheel 91 already proposed by the inventors of this application is very effective to prevent the bead portion from falling onto the well in running with lowered inner pressure, it includes a difficulty in that freedom in the selection of a combination of the distance A and the height H is limited to a narrow range in consideration of the tire mounting and dismounting operation. Moreover, a width P of the bead seat 94 is usually determined by various standards, for example, more than 20 mm for passenger cars. In the case that bead bases of a tire are wide, the width P often exceeds 20 mm. In such a case, the relation between the height H and the distance A is further limited so that the freedom in design of the tire wheel is limited to a narrower range.

SUMMARY OF THE INVENTION

It is an object of the invention to provide an improved tire wheel which eliminates all the afore-mentioned disadvantages and effectively prevents a bead portion of a tire from falling onto a well of the tire wheel and is easier to mount and dismount the tire onto and from the tire wheel.

In order to accomplish this object, in a tire wheel including a pair of flanges provided at both axial ends, respectively, a pair of bead seats axially inwardly extending from the flanges, a well provided between the bead seat and concaved radially inwardly of the bead seats, and a hump provided between the well and at least one of the bead seats and circumferentially extending and having a seat side inclined surface on the side of the relevant bead seat and a well side inclined surface on the side of the well on both sides of a crest of the hump, according to the invention the seat side inclined surface of the hump comprises an inclined surface continuous to the crest of the hump and an inclined surface rising from the relevant bead seat, and a concaved corner having an obtuse angle between the relevant bead seat and the inclined surface rising from the relevant bead seat.

The inclined surface rising from the bead seat may be a curved surface radially convexed. However, the seat side inclined surface of the hump is preferably composed of two frustoconical surfaces having different inclined angles relative to a straight line in parallel with a tire rotating axis. The inclined angle on the side of the crest of the hump is formed within a range of 5° to 30°, preferably 5° to 20°, and the inclined angle on the side of the relevant bead seat is formed within a range 15° to 75°, preferably 20° to 50°. The inclined angle on the side of the bead seat is larger than the inclined angle on the side of the crest of the hump.

With the inclined angle on the side of the crest of the hump, an angle less than 5° is a lower limit in consideration of the hoop effect, while an angle more than 30° extinguishes the hoop effect and causes toe chipping and, what is worse still, makes difficult the tire mounting operation.

With the inclined angle on the side of the bead seat, an angle less than 15° makes the distance A too long, while an angle more than 75° spoils the function of the inclined surface as a guide, that is to say, inherent role and causes toe chipping.

According to the invention, one half of a difference between a diameter of the tire wheel at the crest of the hump and an actual diameter of a rim of the tire wheel is within a range of 0.5 mm to 2.5 mm, preferably 1 mm to 2 mm. Further, a (horizontal) length of the inclined surface in the tire rotating axis on the side of the crest of the hump among the two frustoconical surfaces is within a range of 6 mm to 15 mm. The length less than 6 mm extinguishes the hoop effect, while the length more than 16 mm makes difficult the tire mounting and dismounting operation.

On the other hand, according to the invention the inclined surface on the side of the well is preferably formed by a frustoconical surface intersecting at an angle within 15° to 45° with the straight line in parallel with the tire rotating axis.

The tire wheel constructed as described above functions in the following manner.

First, the tire wheel according to the invention is advantageous in the tire mounting and dismounting operation. The inclined surface on the side of the bead seat is composed of two surfaces (frustoconical surfaces) and the inclined angle of one of the two surfaces on the side of the bead seat is larger than that of the other surface. Therefore, the distance A from the starting point of the hump to its crest becomes short, and the frustoconical surface on the side of the bead seat having a short axial length serves as a guide for the bead portion of a tire riding on the other frustoconical surface with the aid of the larger inclined angle. Consequently, in mounting the tire on this wheel, after the bead portion of the tire has locally once ridden over the rim flange, the bead portion can be easily forced to fall onto the well. As a result of this, the other bead portion on the another side can easily ride over the other rim flange so that the tire mounting operation can be greatly improved to be easily carried out.

Second, the tire wheel according to the invention is superior in prevention of a tire from dislodging from the wheel. When the running tire is punctured and subjected to a lateral force, the bead portion of the tire starts to move in an axially inward direction along the bead seat of the wheel. If the lateral force is further applied to the tire, the bead toe laterally moves and slides over the inclined surface on the side of the bead seat, which is a guide assisting the bead portion in axially inward movement.

An important matter in this case is the provision of the inclined surface on the side of the bead seat, which is relatively short and serves as a guide for the inward movement of the bead toe. Therefore, as the tire rotates, respective parts or the entire circumference of the bead portion continuously moves laterally along the inclined surface on the side of the crest of the hump. As a result, all of the circumference of the bead portion is substantially uniformly supported by this inclined surface so that the bead portion exhibits the hoop effect and is securely fixed to the inclined surface on the side of the crest of the hump.

Consequently, any rim dislodgement in running under a punctured condition can be securely prevented. In order to fix the bead portion thereat in a reliable manner, the horizontal length S of the inclined surface on the side of the crest of the hump is preferably within the range of 6 mm to 15 mm.

The tire mounted on the wheel according to the invention can easily be dismounted from the wheel in the following manner. The inclined surface of the hump on the side of the bead seat is composed of two inclined surfaces having predetermined angles, and the inclined surface among them on the side of the bead seat serves as a guide for the bead toe riding on the hump. Therefore, the tip of the bead toe does not engage the crest of the hump and the bead portion is locally forced into the well by means of a tool, such as bead breaker or the like which locally urges the bead portion axially inwardly. Such an urging is successively effected so that the tire can easily be dismounted from the tire wheel. In this case, in order to avoid any tire toe chipping, the crest of the hump is preferably formed by a curved surface having a radius within the range 1 mm to 5 mm.

Finally, fitting of a tire on the wheel is also advantageously effected according to the invention. The inclined surface on the side of the crest of the hump is required to have a low resistance against a base of the bead portion of the tire in order to permit the bead portion to easily ride over the hump when the tire is being filled with inner pressure.

For this purpose, it is desirable that the angle of this inclined surface is within a range of 15° to 45°. If this angle is less than 15° or more than 45°, resistance of the hump to the bead portion becomes excessive when mounting the tire on wells of the wheel, so that the filled pressure in the tore will be in excess of the safety standard value of JATMA. The angle of 20° to 40° is more preferable.

On the other hand, the bead portion has to be fitted with the rim of the wheel with an inflated air pressure less than 3.0 kgf/cm² which is standardized by Safety Standard of JATMA for tires of passenger cars. Therefore, the height H of the hump is preferably less than 2.5 mm.

When the height H of the hump is less than 0.5 mm, the function restraining the bead portion of a pneumatic tire from moving toward the well is reduced. On the other hand, when the height H of the hump is more than 2.5 mm, there is a risk of the inflated pressure of the tire becoming more than the Safety Standard of JATMA when mounting the tire on the wheel. Therefore, the height H of the hump of 1 mm to 2 mm is particularly desirable.

Moreover, the crest of the hump slidably contacts the inner surface of the bead portion when mounting and dismounting the tire onto and from the tire wheel. In order to avoid any damage of the bead portion due to this sliding contact with the crest of the hump, it is preferable to form the crest with a circular arc having a radius within a range of 1 mm to 5 mm. The crest may be formed with a flat surface in parallel with a tire rotating axis. In this case, the width of the flat surface in the axial direction is preferably within a range of 0.5 mm to 3 mm.

The invention will be more fully understood by referring to the following detailed specification and claims taken in connection with the appended drawings.

BRIEF DESCRIPTION OF THE DRAWINGS

FIG. 1 is a sectional view of the proximity of a hump illustrating one example of tire wheels of the prior art;

FIG. 2 is a sectional view of the proximity of a hump illustrating another example of tire wheels of the prior art;

FIG. 3 is a sectional view of the proximity of a hump illustrating a further example of tire wheels of the prior art;

FIG. 4 is a sectional view illustrating a bead portion of a pneumatic tire mounted on the tire wheel shown in FIG. 3 whose inner pressure reduces and being subjected to a lateral force;

FIG. 5 is a sectional view of the proximity of a hump illustrating a further example of tire wheels of the prior art;

FIG. 6 is a sectional view illustrating a pneumatic tire mounted on the tire wheel shown in FIG. 5 under a condition that its inner pressure lowers and is subjected to a lateral force;

FIG. 7 is a sectional view of the proximity of a hump of a tire wheel already proposed by the inventors of this application;

FIG. 8 is a sectional view of a pneumatic tire mounted on a tire wheel according to the invention taken along an equatorial line of the tire;

FIG. 9 is a sectional view of the proximity of a hump of the tire wheel shown in FIG. 8;

FIG. 10 is a sectional view similar to FIG. 9, but illustrating another embodiment of the tire wheel according to the invention; and FIG. 11 is a sectional view illustrating the bead portion of a tire mounted on the tire wheel shown in FIG. 8 under a condition that its inner pressure lowers and is subjected to a lateral force.

DETAILED EXPLANATION OF THE PREFERRED EMBODIMENTS

Referring to FIGS. 8 and 9 illustrating a first embodiment of the invention, a tire wheel 1 is made of a metal such as steel or aluminum alloy or a reinforced plastic material (FRP, GFRP or the like) and includes at both axial ends a pair of flanges 2 and 3 extending substantially vertically to a tire rotating axis. The tire wheel 1 further includes a pair of bead seats 4 and 5 extending continuously from the flanges 2 and 3 in axially inward directions of the tire wheel 1. These bead seats 4 and 5 are inclined at an intersection angle G of the order of 5° to a straight line L in parallel with the tire rotating axis.

The bead seas 4 and 5 incline axially inwardly and radially inwardly so that the bead seats 4 and 5 are in the form of frustoconical surfaces as a whole. Between the bead seats 4 and 5 the tire wheel 1 is provided with a well 6 recessed or concaved from the bead seats 4 and 5 radially inwardly. The well 6 is formed in the shape of a groove extending in a circumferential direction and used when a pneumatic tire T is mounted on or dismounted from the tire wheel 1.

The tire wheel 1 further includes a hump 7 extending in the circumferential direction between the well 6 and either of the bead seats 4 and 5 which is in this embodiment the bead seat 5 located nearer to the well 6 and on an outer side of a vehicle equipped with this tire wheel 1. The hump 7 has a crest 8 formed at a radially outer end thereof. The hump 7 also has seat side inclined surfaces 9 and 10 having different inclined angles formed on the side of the bead seat 5 and a well side inclined surface 11 on the side of the well 6 on both sides of the crest, respectively. The crest 8 of the hump 7 is rounded in section with a radius of approximately 3 mm.

The seat side inclined surface 9 is located on the side of the crest 8 of the hump 7 and formed by a frustoconical surface intersecting at approximately 10° with the straight line L in parallel with the rotating axis of the tire. On the other hand, the seat side inclined surface 10 is located on the side of the bead seat 5 and formed by a frustoconical surface intersecting at approximately 30° with the straight line L.

The seat side inclined surface 10 and the bead seat 5 form a corner M of an obtuse angle.

The length S of the inclined surface 9 on the side of the crest 8 of the hump 7 in the axial direction is 10 mm, while the distance A from a starting point M of the seat side inclined surface 10 to the crest of the hump 7 is 13 mm.

On the other hand, the well side inclined surface 11 is formed by a frustoconical surface intersecting at approximately 30° with the straight line L.

The height H of the hump 8 is about 1.5 mm which is equal to one half of a difference between a diameter of the wheel 1 at the crest 7 and an actual diameter (D) of the rim of the wheel 1.

Moreover, the wheel includes a hump 12 extending in the circumferential direction between the well 6 and the other bead seat 4 on the farther side from the well 6 and on the inner side of the vehicle for the purpose of safety. This hump 12 is composed of three circular arc surfaces similar to those of the prior art.

Reference T denotes a tubeless pneumatic tire mounted on the tire wheel 1 and whose a pair of beads B are settled on the bead seats 4 and 5, respectively.

FIG. 10 illustrates a second embodiment of the invention. In this embodiment, the inclined angle of a seat side inclined surface 10 on the side of a bead seat 5 is 30°, while the inclined angle of a seat side inclined surface 9 on the side of a hump 8 is 5°. The height H of the hump 8 is 1.5 mm, and the length of the inclined surface 9 on the side of the hump 8 is 8 mm. A distance A is 13 mm identical with that of the first embodiment. A corner M is formed by a curved surface having a radius of 5 mm and concaved inwardly and continuously connects the inclined surfaces 5 and 10. In this case, bead toe chipping later explained becomes difficult to occur.

In the above first embodiment, the invention is applied only onto the outer side of the wheel on which particularly large lateral force exerts in cornering. However, it is of course preferable that if this invention is applied onto both sides of the well of the wheel as the case may be, the wheel exhibit its performance more completely.

The operation of the tire wheel according to the invention will be explained hereinafter.

It is now assumed that a pneumatic tire T mounted on the tire wheel 1 described above is running on a road. If the inner pressure in the tire T lowers due to puncture or the like and a lateral or transverse force is applied to the tire T as shown by an arrow in FIG. 8 owing to turning of a vehicle equipped with the tire T, the bead portion B of the pneumatic tire T moves axially inwardly to fall onto the well 6. However, as the the hump 7 of the wheel 1 includes the inclined surfaces 9 and 10 on the bead seat side composed of the frustoconical surfaces and the concaved corner M of the obtuse angle at the boundary between the inclined surface 10 and the bead seat 5, a sharp bead toe C of the bead portion B engages the corner M to restrain the axially inward movement of the bead portion B of the tire T.

Moreover, if a road contacting portion of the bead portion B is urged by a higher lateral force toward the well, the inclined surface 10 on the bead seat side having the short axial length and the large inclined angle serves as a guide for moving the bead portion (inner surface) in the axial direction so that the bead portion B easily rides onto the inclined surface 9 on the side of the hump.

In this case, upon rotation of the tire, the lateral force moves around the bead portion B for a short period of time so that the bead portion B simultaneously rides over the inclined surface 10 on the bead seat side as the guide and at the same time all the bead portion B settles on the inclined surface 9 on the side of the crest of the hump. Moreover, as the inclined surface 10 on the bead seat side is formed by the frustoconical surface, the inclined angles with the straight line L are constant at any circumferential positions. As a result, the bead portion B uniformly rides on and over the inclined surfaces 10 on the bead seat side and likewise uniformly rides on the inclined surface 9 on the side of the hump.

As shown in FIG. 11, as the inclined surface 10 has a large inclined angle so that it does not uniformly contact the inner surface of the bead portion B as shown in phantom lines in the drawing and the contact pressure between them is low. Consequently, the bead portion B is likely to move in the axial direction even only by a relatively small lateral force. This is the reason why the inclined surface 10 serves as a guide for the bead portion B. Moreover, the bead portion B is formed in shape and size to make it easy to settle the bead portion B on the inclined surface 9 having the smaller inclined angle.

After the bead portion B has once been settled on the inclined surface 9, the inner surface of the bead portion B clamps the inclined surface 9 with a relatively uniform pressure to realize a so-called "hoop clamping condition" with the hoop effect (shown in solid lines in FIG. 11). Even if the bead portion b is subjected to a much higher lateral force causing the bead portion B to ride over the hump 7, the lateral force has to expand the bead portion B further and to overcome the frictional force between the inner surface of the bead portion B and the inclined surface 9 in order to make the bead portion B ride over the hump 7. Therefore, such an axially inward movement of the bead portion B is effectively restrained with the hump 7 and the bead portion B is prevented from falling onto the well 6.

In this case, the bead toe C engages the corner M. However, as the inclined surface 10 on the bead seat side intersects the straight line L at the angle of 30° (within a range of 15° to 75°), the angle of the corner M is a large obtuse angle. As a result, when a lateral force higher than a certain value is applied to the bead toe, the bead toe C passes the corner M and rides over the inclined surface 10 on the bead seat side until the bead toe C settles on the inclined surface 9 on the side of the hump under the hoop clamping condition described above.

Therefore, there is no risk of the bead toe C being subjected to a high shearing force causing bead toe chipping. Moreover, as the distance A between the starting point of the hump and its crest is short and the bead portion B can easily be moved onto the well 6 by locally urging the bead portion, the tire can be dismounted from the tire wheel 1 without any difficulty. No bead toe chipping occurs in such a dismounting of the tire from the wheel.

On the other hand, in mounting a pneumatic tire on the tire wheel 1, first the bead portion of the pneumatic tire T is locally set on the well so that the tire T is once settled on the tire wheel in the same manner as in the dismounting of the tire. Thereafter, the pneumatic tire T is filled with a predetermined inner pressure so that the bead portions are moved axially outwardly causing to ride over the humps 7 and 12 until the bead portions settle on the bead seats 4 and 5. In this case, as the inclined surface 11 of the hump 7 on the side of the well 6 is formed by the frustoconical surface intersecting the straight line L in parallel with the tire rotating axis at the angle 30° (within a range of 15° to 45°), the bead portion B can easily ride over the hump 7 so that the mounting of the tire on the wheel can easily be carried out.

In the above embodiments illustrated in FIGS. 8 to 10, the tire wheels are made of an aluminum alloy whose radially outer surfaces are worked by mechanical cutting so that the inclined surfaces 9 and 10 are substantially conical for the convenience of machining. However, particularly the inclined surface 10 may of course be a curved surface having a curvature in section, so long as the the inclined surface 10 has the proper distance A as described above and serves as a guide for permitting the bead portion B with its entire circumference to settle onto the inclined surface 9 uniformly and simultaneously.

Results of experiment of the tire wheels according to the invention and tire wheels of the prior art will be explained hereinafter.

In this experiment, the inventors prepared tire wheel assemblies as shown in FIGS. 1 and 3 as Prior Art Examples 1 and 2 and tire wheel assemblies as shown in FIG. 7 early proposed by the inventors of this application as Comparative Example 3 and further prepared tire wheel assemblies of the first embodiment as shown in FIGS. 8 and 9 as Present Invention 4 and tire wheel assemblies of the second embodiments as shown in FIG. 10 as Present Invention 5. In the Comparative Example 3, the inclined angle of the hump was 10°, and the distance A was 19 mm, and other dimensions were identical with those in the first embodiment of the invention.

In this experiment, the size of the wheels of the tire wheel assemblies was 8×17, the actual value of rim diameters was 436.6 mm, and the material of the tire wheels was a reinforced aluminum. On the other hand, the pneumatic tires were radial tires for passenger cars whose size was 225/45ZR17.

With these tire wheel assemblies, rim fitting test, rim dislodgement test in laboratory, rim dislodgement test with actual vehicle, and rim mounting and dismounting test were effected.

In the rim fitting test, after a pneumatic tire had been mounted on a tire wheel, the tire was filled with inner pressure to settle bead portions onto bead seats. Inner pressure (kgf/cm$^2$) when the bead portions settle on the bead seats was the test result. In this test, mean values of the pneumatic pressure were obtained as results of the test.

In the rim dislodgement test in the laboratory, after the inner pressure of a tire had been reduced to zero by releasing a valve, the tire was arranged on a movable flat plate having a safety walk attached to its surface. A camber angle of the tire was set at 3°, while a vertical load was being applied to the tire. The movable flat plate was moved at a speed of 1 km/h, during the movement of the plate the slip angle of the tire was progressively increased to cause the bead portions of the ire to fall onto the well of the tire wheel. Slip angles (degree) when falling of the bead portions onto the well were obtained as results of the test.

In the rim dislodgement test with an actual vehicle, after a passenger car of a sports car type carrying four people was equipped with pneumatic tires having inner pressure of zero, the car was driven at a speed of 60 km/h on an automobile test course and turned three times along a J-shaped course having a radius of 30 m. The numbers of times when rim dislodgement occurred were obtained as results of the test.

In the rim mounting and dismounting test, a tire was manually mounted on a wheel by an operator. Feeling of easy or difficulty and working time until both bead portions were fallen onto the well of the wheel were judged as a whole.

In the rim mounting and dismounting test, use was made of an apparatus (bead breaker) for causing the bead portions to fall onto the well of the wheel. After the inner pressure of the tire had been reduced completely to zero, an urging piston pressure of the apparatus was progressively increased. Mean values of cylinder pressures (kgf/cm$^2$) when the tire bead portions fell onto the well were obtained as results of the test. Further, judgment was effected on the basis of external appearance (for example, whether there were any damage or scratches) after the tire was completely removed from the tire wheel.

Results of these tests are shown in Table 1. Since no defect occurred in the judgment of appearance in the rim mounting and dismounting test, results thereof are not shown in Table 1. In the rim dismounting test, as there were interferences of 2 mm between bead portions of the tires and bead seats of the rims, minimum force of 5 kgf/cm$^2$ was needed. Therefore, although a difference from Prior Art Example 1 did not appear, results of the Present Invention are clearly different from those of the Prior Art Example 2 and the Comparative Example 3.

TABLE 1

|  | Tire wheel assembly Prior Art Example 1 | Tire wheel assembly Prior Art Example 2 | Tire wheel assembly Comparative Example 3 | Tire wheel assembly Present Invention 4 | Tire wheel assembly Present Invention 5 |
| --- | --- | --- | --- | --- | --- |
| Rim fitting test (kgf/cm$^2$) | 2.3 | 2.8 | 2.7 | 2.5 | 2.4 |
| Rim mounting test | good | nearly good | nearly good | good | good |
| Rim dismounting test (kgf/cm$^2$) | 5.0 | 5.5 | 6.0 | 5.0 | 5.0 |
| Rim dislodgement test with actual vehicle | dislodged at first time | dislodged at first time | completely ran three times | completely ran three times | completely ran three times |
| Rim dislodgement test in laboratory | 14° | 17° | 19° | 19° | 19° |

As can be seen from these results, the tire wheel assemblies according to the invention are easy to mount and dismount the tire onto and from the wheel and prevent the bead toe chipping and further effectively prevent bead portions from falling onto the well.

As described above, with the tire wheel according to the invention, even if inner pressure greatly lowers, particularly even under a completely punctured condition, bead portions can be effectively prevented from falling onto the well without causing any significant failures such as bead toe chipping. Moreover, with the tire wheel according to the invention, mounting and dismounting tires on and from the wheel can rapidly be effected and therefore the tire wheel is very useful. Furthermore, the tire wheel according to the invention has an advantage in that freedom of design is not limited so much.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A tire wheel including a pair of flanges provided at both axial ends, respectively, a pair of bead seats axially inwardly extending from the flanges, a well provided between the bead seats and concaved radially inwardly of the bead seats, and a hump provided between the well and at least one of the bead seats, wherein said hump has two seat side frustoconical surfaces having different inclined angles relative to a straight line in parallel with a rotating axis of a tire to be mounted on the tire wheel, and the inclined angle of one of the frustoconical surfaces on the side of the relevant bead seat is larger than the inclined angle of the other frustoconical surface on the side of the crest of the hump.

2. The tire wheel as set forth in claim 1, wherein the inclined angle of the frustoconical surface on the side of the relevant bead seat is within a range of 20° to 50°, and the inclined angle of the frustoconical surface on the side of the crest of the hump is within a range of 5° to 20°.

3. The tire wheel as set forth in claim 1, wherein one half of a difference between a diameter of the tire wheel at the crest of the hump and an actual diameter of a rim of the tire wheel is within a range of 0.5 mm to 2.5 mm, and a length of the frustoconical surface on the side of the crest of the hump is within a range of 6 mm to 15 mm in the direction of the rotating axis of the tire.

4. The tire wheel as set forth in claim 1, wherein said hump has an inclined surface on the side of the well which is formed by a frustoconical surface intersecting at an angle within 15° to 45° with the straight line in parallel with the rotating axis of the tire.

5. The tire wheel as set forth in claim 1, wherein the crest of the hump is rounded with a radius within in a range of 1 to 5 mm.

6. The tire wheel as set forth in claim 1, wherein a concaved corner having an obtuse angle is formed between the relevant bead seat and the frustoconical surface on the side of the relevant bead seat by a curved surface having a radius on the order of 5 mm and concaved radially inwardly.

7. The tire wheel as set forth in claim 1, wherein the inclined angle of the frustoconical surface on the side of the relevant bead seat is within a range of 15° to 75° and the inclined angle of the frustoconical surface on the side of the crest of the hump is within a range of 5° to 30°.

* * * * *